July 17, 1962    H. W. MOULD, JR    3,045,134
MAGNETIC COUPLING

Filed Dec. 18, 1958    2 Sheets-Sheet 1

INVENTOR.
HARRY W. MOULD, JR.
BY
Attorney

July 17, 1962     H. W. MOULD, JR     3,045,134
MAGNETIC COUPLING

Filed Dec. 18, 1958                          2 Sheets-Sheet 2

*INVENTOR.*
HARRY W. MOULD, JR.
BY
*Attorney*

United States Patent Office 3,045,134
Patented July 17, 1962

3,045,134
MAGNETIC COUPLING
Harry W. Mould, Jr., Kenmore, N.Y., assignor to Hobam, Inc., Buffalo, N.Y., a corporation of New York
Filed Dec. 18, 1958, Ser. No. 781,361
7 Claims. (Cl. 310—106)

The present invention relates to couplings, and more particularly to magnetic couplings. In a still more specific aspect the invention relates to magnetic couplings which may be employed in a widespread number of uses, such as, for instance, for connecting the drive member of a rotary pump to the driven member, or for coupling a rotating part, which is subject to vibration, to a relatively stationary part, for dampening the vibration of the vibrating part.

Pumps, which use magnetic means to couple the driving element to the driven element, have distinct advantages for pumping liquids such as milk, or for use in the preparation of foods or beverages. By using a magnetic coupling in such pumps it is unnecessary to employ a continuous shaft between the motor, or other source of power, and the driven member. Hence, possibility of leakage of the lubricating oil for the motor into the liquid being pumped is obviated; and no seals are required for this purpose; there is no possibility of contamination of the liquid being pumped by the pump. Such pumps of this type as have previously been constructed, however, have been relatively expensive, and, therefore, they have had restricted use.

In prior pumps employing magnetic couplings, moreover, there is a limited amount of torque which can be transmitted, since heretofore round, horseshoe magnets have been used in such couplings to drive pole-pieces consisting of steel rivets positioned in copper plates. The steel rivets are small in size; and therefore, the amount of torque transmitted between the magnets and the steel rivets is limited.

The engine crank shaft of a motor vehicle is subject to considerable vibration in operation. For this reason efforts have been made to dampen its vibrations. Friction type dampeners are, of course, known. Such dampeners have the advantage that they are adjustable, but since they depend upon friction for their efficacy, they are subject to wear. They should, therefore, be re-adjusted frequently if they are to maintain their efficiency. This is a serious drawback for any automotive installation. There are also viscous type dampeners in use. These depend upon the viscosity of oil or other liquid for their efficacy. Field adjustment of such dampeners, however, is not possible. They, therefore, have their limitations for automotive purposes.

One object of the present invention is to provide a magnetic coupling which will be of simple construction and which will be less expensive to manufacture than known magnetic couplings, and which will be suitable for use in a pump.

Another object of the invention is to provide a magnetic coupling whose air-gap can readily be adjusted in the field, thereby rendering it particularly suitable for use as a vibration dampener.

Another object of the invention is to provide a magnetic coupling which will transmit greater torque for a coupling of a given size than magnetic couplings of prior constructions.

Other objects of the invention will be apparent hereinafter from the specification and from the recital of the appended claims.

Figure 1:
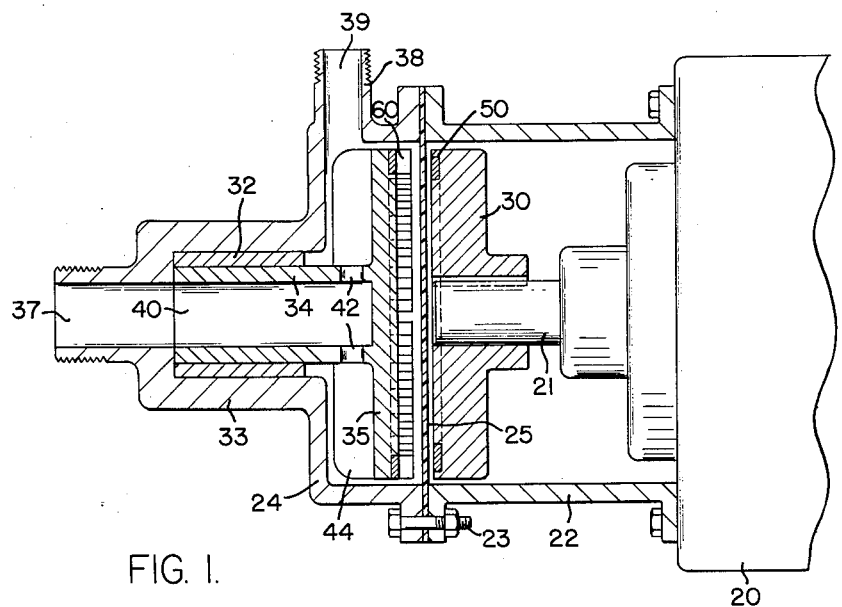
FIG. 1 is a fragmentary axial section through a pump constructed according to one embodiment of this invention, the motor, to which the pump is connected, being shown fragmentarily only and in elevation.

Referring now to the drawings by numerals of reference, 20 denotes the drive motor for the pump illustrated in FIG. 1. This motor has the usual drive shaft 21, and has a housing 22 secured thereto. Secured to this housing, as by means of bolts 23, is the pump casing 24. A diaphragm 25 made of a non-magnetic material, such as stainless steel, is interposed between the opposed flanges of the housing 22 and the casing 24, and is secured in place between the housing and the casing by the bolts 23.

Keyed to the free end of the shaft 21 is a pole piece plate or carrier 30. Journaled on a bushing 32 in a tubular extension 33 of the casing 24 is the sleeve portion 34 of a magnet carrier 35. The bore 37 of the tubular extension 33 provides an inlet for the liquid which is to be pumped by the pump; and the casing 24 is provided at one side with a tubular extension 38 whose bore 39 forms an outlet for the pump. The sleeve 34 is provided with radial ports 42, which serve to connect its bore 40 with outlet 39. Integral with or secured in any desired manner to the magnet carrier 35 are the impeller blades 44. The bore 40 of the sleeve 34 is in axial alignment with the bore 37 of the tubular extension 33 of the casing; and the liquid being pumped flows from bore 37 into bore 40. Thence it passes through the ports 42 radially outwardly, where it is picked up and driven by the impeller blades 44 onto the outlet opening 39.

Figure 3:
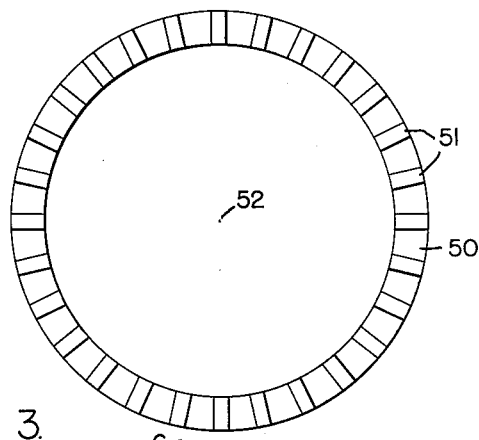
FIG. 3 is a front elevation of a pole-piece for a coupling constructed according to the present invention.
Figure 4:
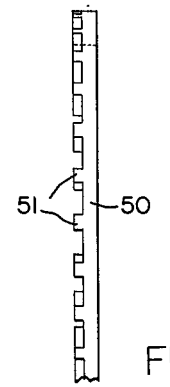
FIG. 4 is a side elevation of this pole-piece.
Figure 5:
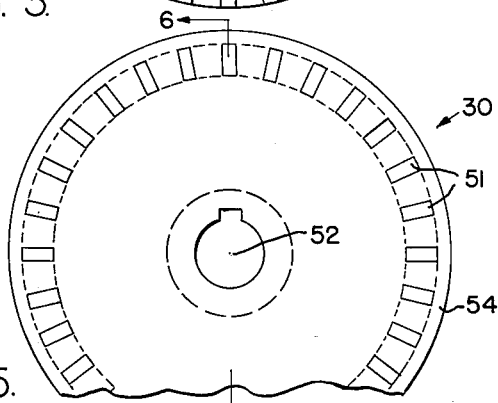
FIG. 5 is a fragmentary front view of the assembled pole plate of the coupling.
Figure 6:
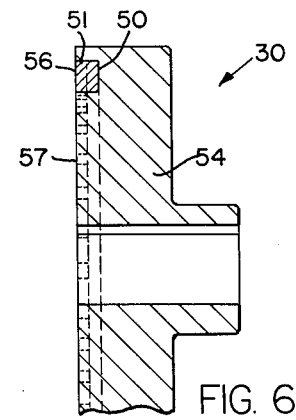
FIG. 6 is an axial section of the assembled pole plate.

The pole piece carrier of the present invention is of unique construction. It comprises a plate 50 (FIGS. 3 and 4) made of magnetic material, such as steel, and provided with a plurality of oblong shaped teeth 51 (FIGS. 3, 4, 5 and 6), which project from one side face of the plate, and which extend in a direction generally radial of the axis 52 of the plate. This plate 50 is embedded in a carrier member 54 (FIG. 6) which may be made of aluminum, or other non-magnetic material. The aluminum, or other non-magnetic material, is cast about the plate 50 and its teeth 51, so that the teeth 51 are substantially completely embedded in the carrier member with their top surfaces flush with the front face 57 of the carrier member.

Figures 7, 8:
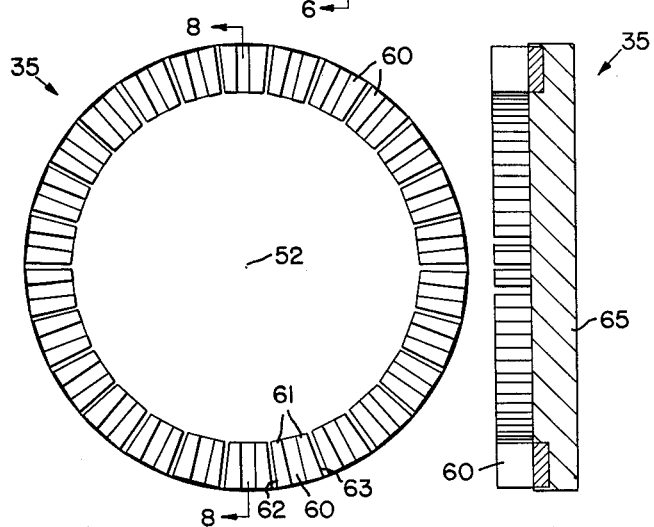
FIG. 7 is a front view of a magnet plate constructed according to one embodiment of this invention.
FIG. 8 is an axial section through this magnet plate.
Figure 9:
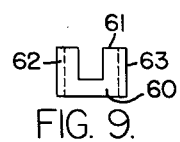
FIG. 9 is a fragmentary end view of a magnet such as may be used in this magnet plate.

The magnetic carrier 35 shown in FIG. 1 is also unique in construction. It comprises a plurality of horseshoe magnets 60 (FIGS. 7, 8 and 9) whose poles 61 are generally oblong in shape but have their distal sides 62 and 63, respectively, converging inwardly, generally radially of the axis 52 of the magnet carrier. These magnets are mounted in an aluminum casting 65, which constitutes the carrying member of the magnet carrier.

Figure 10:
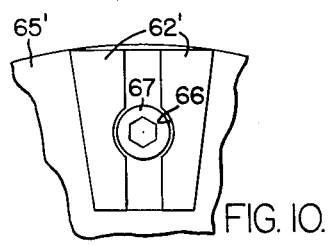
FIG. 10 is a fragmentary front view of a magnet plate constructed according to a different embodiment of the invention and on an enlarged scale.
Figure 11:
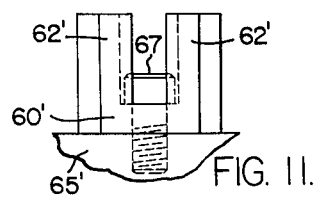
FIG. 11 is a fragmentary end view showing the method of mounting the magnet on this modified form of plate.

Instead of casting the aluminum around the bases of the magnets, however, thereby securing the magnets in the aluminum, they may be bolted to an aluminum plate 65' as shown in FIGS. 10 and 11. Here the magnets are denoted at 60'; and their poles at 62'. The opposed inside walls of the poles of each magnet are recessed, as denoted at 66, midway of their lengths. This permits ready access to the bolt 67 by means of which the magnet is fastened to the plate 65'.

Preferably there are two more teeth 51 in the pole piece 50 than there are magnets 60 or 60' mounted on the carrier plate 65 or 65'. This insures immediate starting of the pump when the drive motor 30 begins to rotate.

Because the pole pieces are oblong shaped, as are the poles of the magnets, a coupling of a given size constructed according to the present invention transmits greater torque than magnetic couplings of prior conventional construction.

Figure 2:
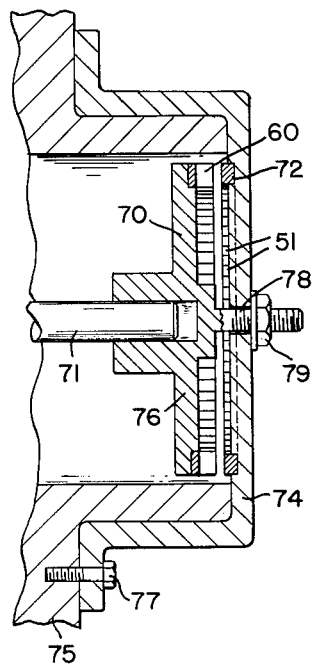
FIG. 2 is a fragmentary axial sectional view showing a vibration dampener constructed according to one embodiment of this invention.

For use in dampening the vibrations of an automotive engine, for instance, a magnet carrier 70, similar to carrier 35 already described, may be secured to the crank shaft 71, (FIG. 2) of the engine, and a pole plate 72, similar in construction to the pole plate 30, may be secured rigidly in an aluminum closure member 74 that is bolted or otherwise fastened to the engine block 75 by bolts or screws 77. The magnet carrier 70 will have a plurality of magnets 60 mounted therein in a carrier member 76 made of aluminum or other non-magnetic material. The pole piece 72 will have a plurality of oblong teeth 51, and may be cast into the aluminum closure member 74.

In a vibration dampener it is not necessary to interpose a diaphragm between the magnets and the pole pieces. To adjust the effectiveness of the dampener, however, the air gap between the magnets and the pole pieces may be adjusted. For this purpose, for instance, a stud 78 may be formed integral with the magnet carrier 70. This stud projects through aligned axial holes in the pole plate 72 and the cover plate 74, and is threaded to receive a nut 79. Adjustment of the magnet carrier relative to the pole piece carrier may be effected, in order to adjust the air gap between the two, and thereby to adjust the dampener, by loosening bolts or screws 77 and threading nut 79 along stud 78. The screws 77 are retightened after the desired adjustment of pole piece carrier 74.

While the invention has been described in connection with different uses and embodiments thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A magnetic coupling comprising a first member having a plurality of permanent, horseshoe-shaped magnets mounted thereon in angularly spaced relation about a common axis, a second member comprising a ring of paramagnetic material having a plurality of teeth integral therewith and arranged in angularly spaced relation about a common axis and constituting a pole piece, and a carrier for said pole piece of non-magnetic material of relatively high electrical conductivity in which said ring and its teeth are embedded to the full depth of its teeth, said carrier covering the whole of said ring except for the tops of the teeth of said ring, one of said members, at least, being rotatable, and said members being adapted to be mounted with the poles of said magnets projecting toward said teeth and in operative relation therewith.

2. A magnetic coupling as claimed in claim 1 in which said teeth are oblong in longitudinal cross-section and of uniform width from end to end.

3. A magnetic coupling comprising a first member having a plurality of permanent, horseshoe-shaped magnets mounted on one side face thereof in angularly spaced relation about a common axis and disposed with their poles projecting from said member in the general direction of said axis, a second member comprising a ring of paramagnetic material, constituting a pole piece and having a plurality of teeth integral therewith and arranged in angularly spaced relation about a common axis and projecting from one side face of said ring in the general direction of said common axis, and a carrier for said pole piece of non-magnetic material of relatively high electrical conductivity in which said ring, including its teeth, is embedded around its periphery and its other side face and to the full depth of its teeth so as to have only the tops of said teeth exposed, said members being arranged with said magnets disposed in confronting opposed, operative relation to the tops of said teeth, and one of said members, at least, being rotatable.

4. A magnetic coupling as claimed in claim 3 in which said teeth are oblong in longitudinal cross-section.

5. A magnetic coupling as claimed in claim 4 in which said magnets have poles which are generally oblong in shape longitudinally, the distal sides of said poles converging toward one another inwardly from the periphery of said first member toward said common axis.

6. A magnetic coupling according to claim 1 wherein there are at least two more teeth in said second member than magnets on said first member.

7. A magnetic coupling according to claim 3 wherein there are at least two more teeth in said second member than magnets on said first member.

References Cited in the file of this patent

UNITED STATES PATENTS

| | | |
|---|---|---|
| 1,862,267 | Honig | June 7, 1932 |
| 1,958,043 | Heintz | May 8, 1934 |
| 2,437,871 | Wood | Mar. 16, 1948 |
| 2,444,797 | Williams | July 6, 1948 |
| 2,568,348 | McCauley | Sept. 18, 1951 |
| 2,633,339 | Okulitch | Mar. 31, 1953 |
| 2,705,762 | Pile | Apr. 5, 1955 |
| 2,711,306 | Levi | June 21, 1955 |
| 2,810,349 | Zozulin | Oct. 22, 1957 |

FOREIGN PATENTS

| | | |
|---|---|---|
| 64,301 | Switzerland | Mar. 7, 1913 |